United States Patent
Aida

[11] Patent Number: 5,920,645
[45] Date of Patent: *Jul. 6, 1999

[54] IMAGE FORMING APPARATUS AND METHOD WHICH PERFORMS AN UNDER COLOR REMOVAL PROCESS USING IMAGE SIGNALS OBTAINED DURING A SCANNING OPERATION

[75] Inventor: Midori Aida, Toronto, Canada

[73] Assignee: Ricoh Company, Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/516,980

[22] Filed: Aug. 18, 1995

[30] Foreign Application Priority Data

Aug. 18, 1994 [JP] Japan .................................. 6-193996

[51] Int. Cl.$^6$ .................................................... G06K 9/00
[52] U.S. Cl. .......................................... 382/167; 358/518
[58] Field of Search .................................. 382/167, 164; 398/518, 520, 521, 515

[56] References Cited

U.S. PATENT DOCUMENTS

| | | |
|---|---|---|
| 4,750,209 | 6/1988 | Shimura et al. ............................ 382/9 |
| 5,208,663 | 5/1993 | Hiratsuka et al. ......................... 358/75 |
| 5,237,400 | 8/1993 | Washio et al. ............................ 358/516 |
| 5,245,419 | 9/1993 | Gu .......................................... 358/521 |
| 5,287,209 | 2/1994 | Hiratsuka et al. ....................... 358/459 |
| 5,357,354 | 10/1994 | Matsunawa et al. .................... 358/530 |
| 5,386,305 | 1/1995 | Usami ..................................... 358/521 |
| 5,402,253 | 3/1995 | Seki ........................................ 358/520 |
| 5,420,938 | 5/1995 | Funada et al. .......................... 382/173 |
| 5,583,667 | 12/1996 | Yamada .................................. 358/529 |

*Primary Examiner*—Yon Couso
*Attorney, Agent, or Firm*—Oblon, Spivak, McClelland, Maier & Neustadt, P.C.

[57] ABSTRACT

A color image forming apparatus and method which optically reads an original image of a document and obtains color image signals representing the document. A color characteristic of the original image is discriminated during a first scanning operation to determine the characteristics of the document including detecting regions of the document which are color, black and white, made of a photograph, or text. The parameters of an under color removal are set based on the detected characteristics of the document. A second scanning operation is performed and the under color removal process is performed based on the previously set parameters. The under color removal process is a process in which the intensity of the color signals is reduced. The black component of the image is generated based on the amount by which the intensity (or density) of the color image signals are reduced. The processed image is then printed.

16 Claims, 4 Drawing Sheets

IMAGE FORMING APPARATUS AND METHOD WHICH PERFORMS AN UNDER COLOR REMOVAL PROCESS USING IMAGE SIGNALS OBTAINED DURING A SCANNING OPERATION

BACKGROUND OF THE INVENTION

1. Field of the Invention

This invention relates to the field of color image forming apparatuses such as digital copying machines or color facsimile machines, and in particular relates to an apparatus for controlling an under color removal process used for generating a black component using color image signals of an original document.

2. Description of the Related Art

A color image forming apparatus such as a digital copying machine or a color facsimile machine which optically reads an original image of a document and obtains color image signals with an image scanner, processes the signals, and prints the color image is well known. In this kind of apparatus, it is important to perform appropriate signal processing on the image signals with respect to characteristics of the image, depending on whether the input image is a natural color photographic image or a monochrome text image. When a natural color photographic image is formed by the apparatus, basic colorants such as cyan (C), magenta (M), yellow (Y) and black (Bk) are used to print the image. When the original document includes only monochrome text, the image forming operation may only use the black colorant (Bk).

Some types of image forming apparatuses provide a discrimination of the chromatic range of an inputted document image which is used for controlling the image forming operation. The discrimination determines whether the inputted image includes chromatic components in a predetermined amount or more. Based on the discrimination, the apparatus controls whether the image forming operation therein is a full color operation or a black and white operation. The time consumed during the image data processing and forming of full color images is much longer than the time required for forming monochrome images. According to this discrimination, the apparatus might detect the existence of a binary text region or a natural color photograph region in the inputted image. For example, this kind of apparatus is disclosed in U.S. Pat. No. 5,208,663, which is incorporated herein by reference.

For detecting input image characteristics, there are two kinds of conventional systems used in image forming apparatuses. The first one is a pre-scan system which uses an additional scanning operation for discriminating input image characteristics before the image forming operation starts, and determines the condition and parameters which will be used during the actual image forming operation. A subsequent scanning operation for actually forming the image using the previously determined conditions is then performed.

The second type of conventional system is a pre-scanless system which performs an initial image forming operation during a first scanning operation. Typically, the initial image forming operation is an operation using the black colorant. The pre-scanless system detects color characteristics of the input image such as the amount of the chromatic components in the image which is obtained in the first scanning operation. If a predetermined chromatic component is detected in the first scanning operation, the image forming apparatus detects that the input image is a color image. Accordingly, the apparatus is changed from initial image forming operation (e.g. black component) to the chromatic image forming operation during the second scanning operation for image forming.

In the image forming apparatus using the pre-scan system, the copying time of the document is increased because of the additional scanning operation necessary for image discrimination. Therefore, productivity of document duplication and work efficiency is reduced. However, even in the pre-scanless system, there is a reduction in the quality of the image or image fidelity. The pre-scanless system initially performs the black colorant operation of the image forming operation. When the image forming operation is for a color image, the pre-scanless system is limited in the amount of under color removal (UCR) which can be performed for each of color image signals.

In a pre-scanless system, the formed image might be limited in the amount of the black components which can be eliminated from each of input color signals so as to avoid generation of noise or darkness in a highlight region of the color image. However, if the image is determined to be an achromatic image (e.g. a black and white image), the recording density of the Bk colorant in the formed image would be reduced and image fidelity reduced because other colorants used for forming chromatic images are not used. Therefore, the formed image would lack sufficient recording density and resolution. Further, when the scanned image is a color image but the first scan is used to generate the black component, a recording density of the Bk component would be so dark in the formed image that the formed image would lack quality and become noisy, especially in the highlight region of the chromatic image, even though the black component would be appropriate for a black and white document.

SUMMARY OF THE INVENTION

Accordingly, one object of the present invention is to provide a novel apparatus for forming a duplicate image with a high quality using a selection of the under control removal (UCR) process based on a discrimination of characteristics of the original image.

Another object of the present invention is to provide a novel apparatus for forming a high quality duplicate image efficiently using a pre-scanless system which discriminates the characteristic of the original image during the first scanning operation.

The present invention is adopted to the pre-scanless system which obtains and discriminates the characteristics of the document image in the first scanning operation. The discrimination is provided by detecting the chromatic components of the image. According to the discrimination result, the present invention controls the conditions of the UCR process performed during the image forming operation.

The initial condition of image forming of the present invention is adopted to the black colorant used for forming achromatic images. The present invention may change the initial condition based on the result of the discrimination. A line address of a main scan line is determined and stored in the first scanning operation in order to discriminate the characteristics of the inputted images. The present invention utilizes the line address in the second scanning operation for performing an appropriate image forming operation. Furthermore, when combined with an image region segmentation technique, the invention allows a high adaptability for appropriate image forming, especially for photographic images.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
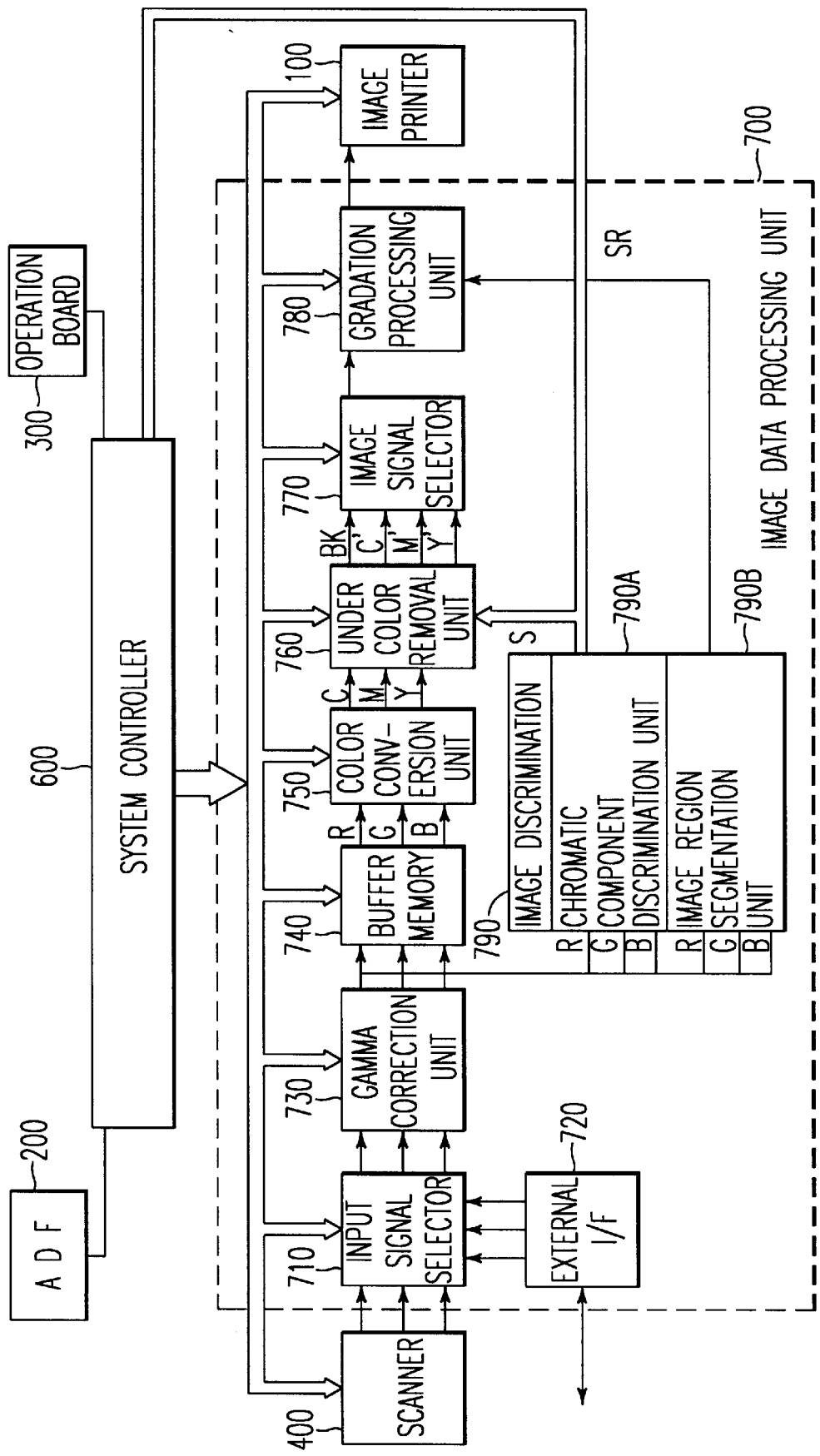
FIG. 1 is a block diagram of an implemented embodiment of the present invention.

Referring now to the drawings, wherein like reference numerals designate identical or corresponding parts throughout the several views, and more particularly to FIG. 1 thereof, there is illustrated an embodiment of this invention implemented in a digital color copying machine. The digital color copying machine, also referred to as an image forming apparatus, includes an image printer 100, an automatic document feeder 200 for providing original documents to be scanned, an operation board 300 for setting an operation mode of the image forming apparatus and inputting the parameters and commands used to run the apparatus, an image input unit 400 which is typically a scanner for inputting image signals, a system controller 600 for controlling the image forming operation, and an image data processing unit 700 which processes input image signals.

The image input unit or scanner 400 is a color image scanner with a CCD (Charged Couple Device). Input images are acquired by the scanner as raster image data represented with a 400 dpi (dot per inch) resolution having an eight bit (256 tone) density level of reflectance provided as a linear signal. Each scanning operation of the image input unit 400 provides a color image signal represented using Red, Green, and Blue (RGB) signals for each pixel. Input images scanned by the image input unit 400 include not only binary image regions such as text images, but also may include photographic or gray-scale regions.

The image printer 100 may be implemented as a color laser printer which includes a photosensitive drum and four image development systems using cyan (C), magenta (M), yellow (Y) and black (Bk) colored toners, respectively. The four image development systems develop static latent images on the photosensitive drum for generating a toner image which is transferred to a recording paper using an electrophotographic process. When forming monochrome images such as binary text images, this embodiment develops a static latent image on the photosensitive drum using only Bk toner which is transferred to the recording paper. When forming natural color images such as for color photographic document images, the scanning operation of the present embodiment may be repeated four times in order to obtain the color image signals with respect to colorants C, M, Y, and Bk. Therefore, this embodiment performs the image developing process four times, once for each of the C, M, Y, and Bk toners. However, using an alternative printing unit such as a color ink jet printer, a sublimation-type color printer, or other types of color printers do not depart from the scope of this invention.

The system controller 600 provides a sequence control of the image forming operation. In the present embodiment, the first scanning operation obtains an image corresponding to the Bk colorant. A Bk signal is generated from the R, G, and B signals obtained in the first scanning operation. Then, the next scanning operation is used to form an image with respect to the C, M, and Y colorants. The system controller 600 is provided with a microprocessor unit (MPU) for controlling the image forming operation, a ROM for storing predetermined control programs and parameters for the MPU, and a RAM which functions as a work area memory of the MPU.

An image data processing unit 700 performs data processing on input image signals obtained from each scanning operation so as to form a duplicated image with high quality. The image data processing unit 700 outputs the image data to the image printer 100 after performing each of the necessary image data processing operations. The image data processing unit 700 includes an input signal selector 710, an external interface 720, a γ (gamma) correction unit 730, a buffer memory 740, a color conversion unit 750, an under color removal unit 760, an image signal selector 770, a gradation processing unit 780, and an image discrimination unit 790 which includes a chromatic component discrimination unit 790a and an image region segmentation unit 790b.

Input signal selector 710 selects input signals from the image input unit 400 and the external interface 720. The external interface 720 is an interface for receiving image signals from external systems such as image data from a computer system, a VCR system, or other suitable video source. The external interface 720 adjusts the image signals from the external system in order to duplicate an image using the present embodiment of the invention. The γ (gamma) correction unit 730 performs a correction process on the input image signals so as to correct a gradation characteristic (tonality) of an image input thereto, and outputs image signals with corrected gradation characteristics. Buffer memory 740 is provided for controlling the image data stream synchronizing data processing of image signals in the image data processing unit 700.

The color conversion unit 750 converts the input R, G, and B signals, which have linear characteristics based on the reflectance of the document image input by the image input unit (scanner) 400, into the C, M, and Y signals which are represented for the colorant density in the image printer 100. The color conversion process performs a masking process with predetermined complementary coefficients of color signals which are stored in the color conversion unit 750.

The Under Color Removal (UCR) unit 760 performs an under color removal process so as to generate a black component used with the Bk colorant from inputted C, M, and Y signals. An under color removal (UCR) process is a process in which the intensity of the color signals is reduced. The black component of the image can then be generated based on the amount by which the intensity (or density) of the color image signals are reduced. The UCR unit 760 generates C', M', and Y' signals which have eliminated the Bk value from each of the color signal values. The UCR unit 760 includes a plurality of UCR processes which are performed based on a condition of a chromatic which has been input. The appropriate UCR process is selected by a selection signal (S) from the color judgment unit 790a of the image discrimination unit 790 or the system controller 600.

The image signal selector 770 performs a signal selection for image signals of the C, M, Y, and Bk colorants from the UCR unit 760 so that the selected image signal has a gradation processing performed thereon by the gradation processing unit 780.

Gradation processing unit 780 provides the image printing unit 100 with gradation processed signals so as to make a gradation within the printed pixels. For example, the gradation processing unit 780 uses a dither process with a threshold matrix for pixel data so as to control the printing of dot diameter or laser beam intensity in the image printer unit 100.

The chromatic component discrimination unit 790a of the image discrimination unit 790 provides discrimination of color characteristic of the image so as to control the conditions of the UCR process and the color conversion process of the image forming operation. Image signals obtained by the first scanning operation are provided to the chromatic component discrimination unit 790a. If the chromatic component discrimination unit 790a does not discriminate the input image as a chromatic or color image, the system controller 600 indicates that an achromatic image forming operation is to be performed and a monochrome or gray scale image is generated. This operation is simply the same operation performed when a monochrome image forming mode (Bk colorant only) is designated using the operation board 300.

Furthermore, the image discrimination unit 790 includes the image region segmentation unit 790b which operates based on the operation mode designated by the operation board 300 of the image forming apparatus. The result of the image region segmentation indicates characteristics of image regions such as a binary text region or a photograph region in the image. The result of the image region segmentation is provided to the gradation processing unit 780 as a selection signal (SR) so as to control the dither process for making gradation in the printed pixels. Image region segmentation techniques are well known in the field of document processing. For example, a segmentation process is disclosed in U.S. Pat. No. 4,750,209, which is incorporated herein by reference. However, alternative methods of image region segmentation may be performed and do not depart from the spirit and scope of the present invention.

Figures 2A, 2B, 2C:
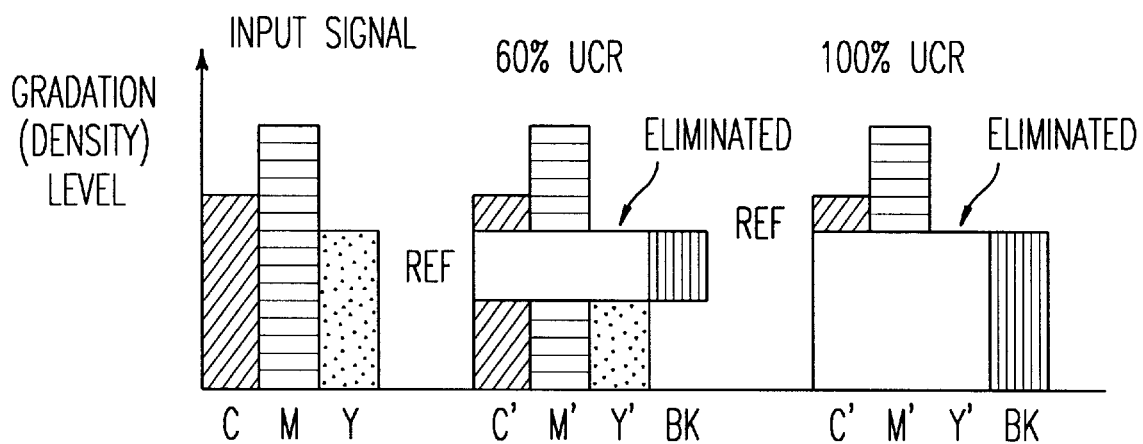
FIG. 2 is a diagram for explaining the under color removal processing of the present invention.

FIGS. 2(*a*), 2(*b*), and 2(*c*) show the UCR process which generates the Bk component from the C, M, and Y signals in the present invention. FIG. 2(*a*) is a graphic diagram which shows an original set of input image signals. The X axis represents the color signals Cyan, Magenta, and Yellow (C, M, and Y), and the Y axis represents the gradation (density) level of the image signals. In this embodiment, the UCR process decides the component from the difference between a minimum signal level of the input color signals and a predetermined reference value REF. In this example, the signal with the minimum level is the Y signal.

FIG. 2(*b*) shows an example of a UCR process. In this process, the reference value REF is 60% of the input minimum signal. This process generates C', M', and Y' signals for eliminating the Bk value from each of the input signals C, M, and Y as shown in FIG. 2(*b*). These signals resulting from the UCR process are subsequently used to form a chromatic image.

FIG. 2(*c*) shows an example of another UCR process. In this process, the reference value REF is 100% of the input minimum signal. This process generates C', M', and Bk signals from each of the input signal values of C, M, and Y. There is no Y' signal in this example, as shown in FIG. 2(*c*), because Y is completely eliminated. These signals resulting from the UCR process are subsequently used to form an achromatic (black and white) image.

The process described with respect to FIG. 2(*c*) is used to obtain a Bk signal used when forming achromatic images and is the initial or default condition of the system. In the first scanning operation for forming Bk signal, if the chromatic component discrimination unit 790a of the discrimination unit 790 determines the original image is a chromatic image, the image discrimination unit 790 provides a selection signal (S) for the UCR unit 760 so as to change the condition of UCR process for chromatic image forming as described with respect to FIG. 2(*b*). According to the changing of the condition of the UCR process, the present invention provides appropriate conditions of the UCR process for the image characteristics. The UCR processing is especially suitable for a highlighted region of a chromatic image because it is able to reduce the black component of the highlight region, thereby reducing darkness caused by the black component.

Figure 3:
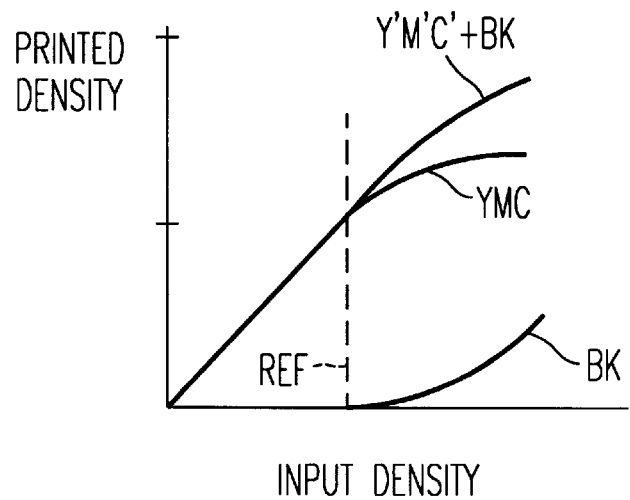
FIG. 3 is a diagram which shows the characteristics of the under color removal processing of the present invention.

FIG. 3 is a diagram for explaining a relationship between a density of input image signals and a printed density. The X axis represents the density of the input image signals and the Y axis represents the printed density of the formed image. In FIG. 3, the line YMC represents the total density of input signals Y, M, and C, the line Bk represents the generated density of the black signal which is generated by the UCR unit 760, and the line Y'M'C"+Bk represents the generated density which is processed in the UCR unit 760. By controlling the reference value REF in the UCR unit 760 of the present embodiment, it is possible to reduce the magnitude of the Bk signal so as to reduce the black component of the highlight region of photographic images.

Figure 4:
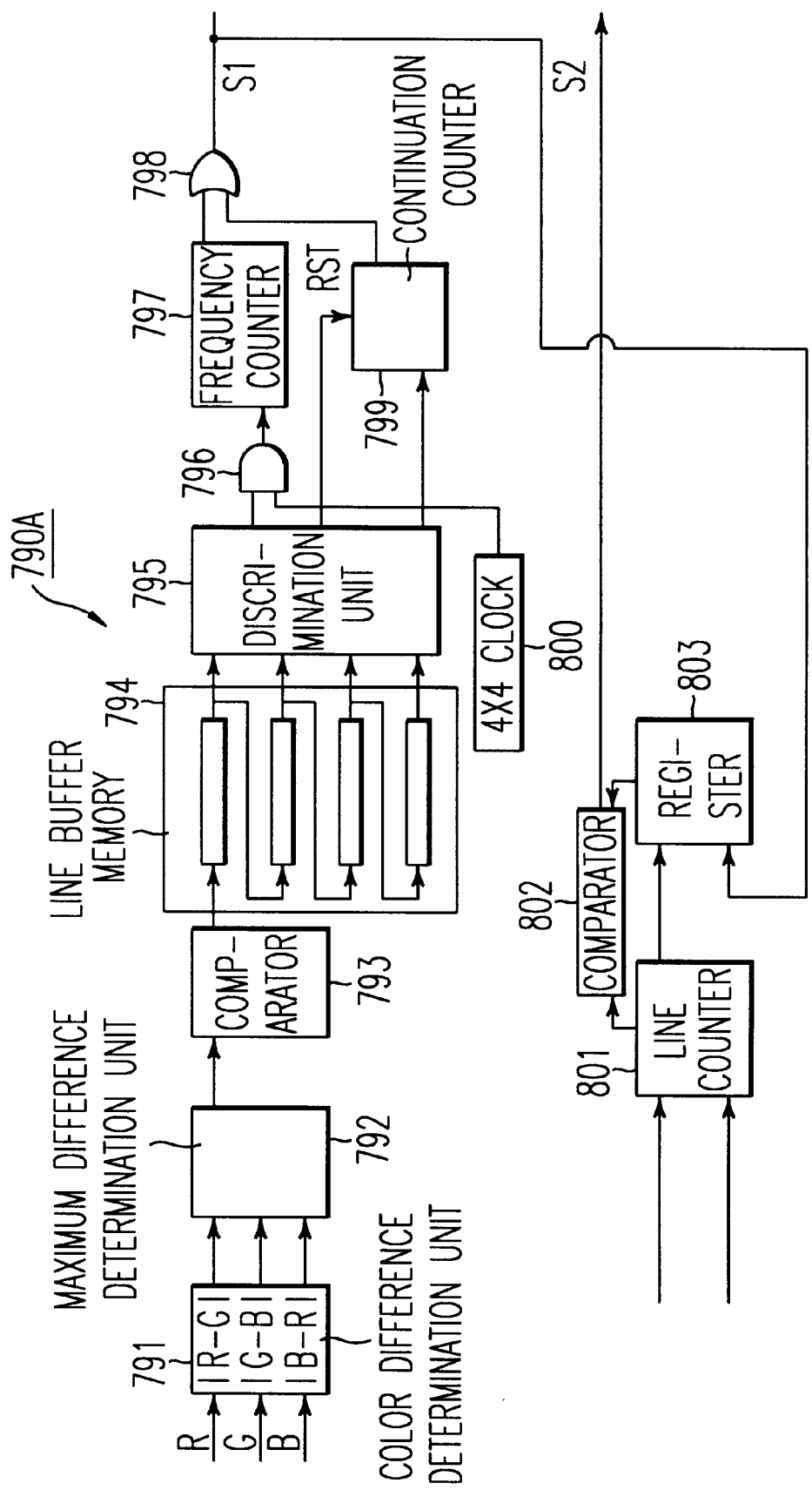
FIG. 4 is a block diagram which shows an implemented embodiment of the image discrimination unit 790 illustrated in FIG. 1.

FIG. 4 shows an implemented embodiment of the chromatic component discrimination unit 790a. Each of image signals of R, G, and B obtained in the first scanning operation are provided to a color difference determination unit 791 which calculates the absolute values of the differences of combinations of two image signals of the R, G, and B image signals. Then, a maximum difference determination unit 792 determines the signal from among the difference signals which have been output by the color difference determination unit 791 which has a maximum value. The maximum signal which is determined by the maximum difference determination unit 792 is compared with a predetermined threshold stored in a comparator 793 for discriminating a chromatic pixel. A line buffer memory 794 stores the output of the comparator 793 as a pixel matrix which is a unit for the discrimination of the chromatic portion of an image. In this embodiment, the line buffer memory 794 stores four lines of pixel signals along a main scanning direction so as to form pixel matrices having sixteen pixels of four columns and four rows. After forming the pixel matrices, a discrimination unit 795 counts the number of chromatic pixels in each of the pixel matrices and compares the number of chromatic pixels with a predetermined threshold so as to discriminate whether or not the pixel matrix is a chromatic portion. The discrimination unit 795 outputs a result of the discrimination of the pixel blocks to both an AND gate 796 and a continuation counter 799. The frequency of the chromatic matrix is detected by a frequency counter 797 using the output of the AND gate 796. Input into the AND gate 796 is the output of the discrimination unit 795 and a signal from a 4×4 clock generator 800. Furthermore, a continuation of existence of a chromatic matrix is detected in a continuation counter 799. The continuation counter 799 is reset with a signal RST which is output when an achromatic block is detected by the discrimination unit 795. Both of the counters 797 and 799 count the number of the chromatic pixels in the matrix. If a predetermined counting value is reached in either of the counters 797 or 799, the selection signal S1 is output through the OR gate 798 so as to control the UCR process of the UCR unit 760.

A line counter 801, a comparator 802, and a register 803 are provided for counting the number of the main scan lines and for storing a line address of the main scan line at which the image discrimination unit 790 determines that a chromatic image exists. The line counter 801 receives a first signal which indicates a start of the image and a second signal each time a new line is encountered. The line address which is stored in the register 803 is called the discrimination scan line. The discrimination scan line may be determined during a first scanning operation and utilized during and after a second scanning operation for controlling the UCR process in the image forming operation. In the present embodiment, a plurality of UCR processes may be performed during and after the second scanning operation. The UCR processes may be controlled by the addresses or discrimination scan lines which have been stored in the register 803. Therefore, at least two UCR processes may be employed during the chromatic image forming operation during and after the second scanning operation. Each UCR process may have different UCR characteristics. Control of the different UCR processes may be performed to prevent a generation of a boundary line in the formed image before and after the discrimination line.

Figure 5:
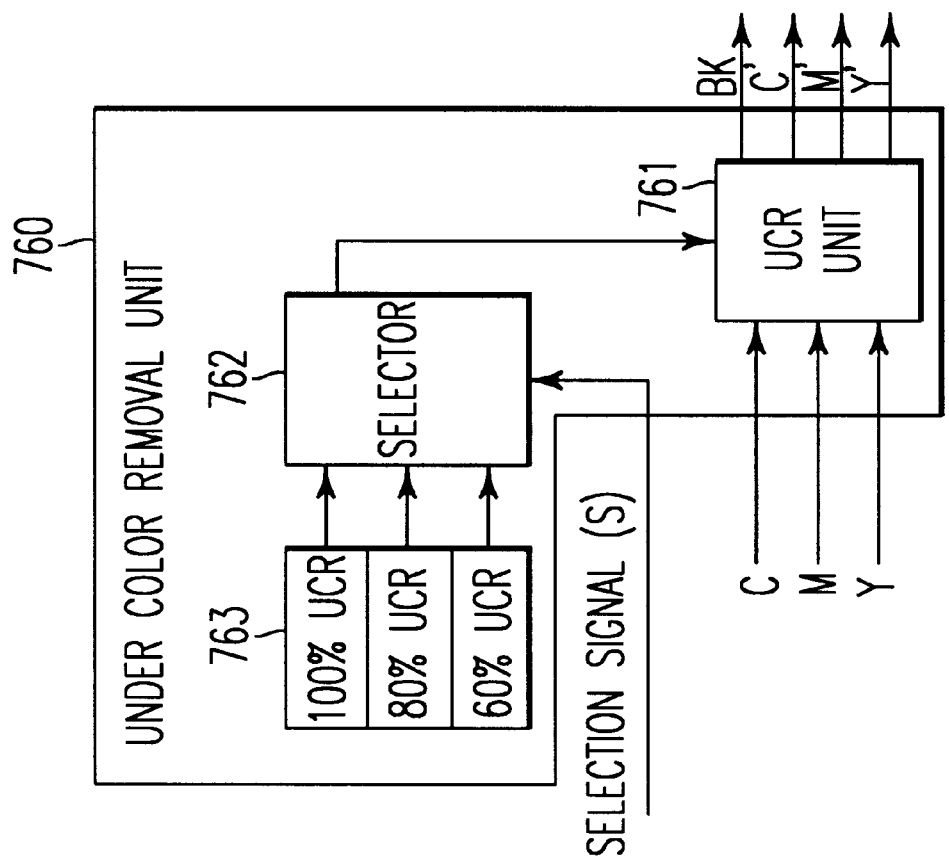
FIG. 5 is a block diagram which shows an implemented embodiment of the under color removal unit 760 illustrated in FIG. 1.

FIG. 5 shows an implemented embodiment of the UCR unit 760 which performs the UCR processing. An under color removal unit 761 compares the image signals C, M, and Y of the input image and eliminates the Bk component from each of the color signals using the reference value REF so as to generate the Bk, C', M', and Y' signals. The ROM 763 stores a plurality of reference values (REF) which define a removal amount of the Bk component from the input color signals. The chromatic component discrimination unit 790a provides the selection signal (S) for a selector 762 so as to select the reference value (REF) of the UCR process. The selection signal S is based on S1, S2, and/or an output from the system controller 600 and indicates both when the UCR process is to be performed and the percentage of UCR processing which is to be performed. The signal S may also be based on input from the operation board 300.

The following descriptions indicate the characteristics of the UCR process defined for the various values of REF.

REF 100%: This condition is used for the achromatic image forming with only the Bk colorant so as to generate a Bk component which has the same value as the minimum color signal from the input color signals C, M, and Y. The UCR process with REF 100% is provided for the initial condition of the UCR process during the first scanning operation of the image forming operation.

REF 80%: This condition is provided for the image area from the discrimination scan line to the end of the document image so as to generate a Bk component with the same value as 80% of the minimum color signal. The UCR process with REF 80% is used when the chromatic component discrimination unit 790a determines the image document has a color portion.

REF 60%: This condition is provided for the image area from the top of the document image to the discrimination scan line during and after the second scanning operation for image forming with respect to the C, M, Y colorants. The UCR process with REF 60% generates a relatively small amount of the Bk component. Therefore, this condition is appropriated for the image area which had the achromatic UCR process performed during the first scanning operation.

In a variation of the invention, in place of the UCR unit 760 of the above mentioned embodiment, the color conversion unit 750 stores a plurality of complementary coefficients which are arranged from the achromatic image forming operation to the chromatic image forming operation. Each coefficients is selected by a selection signal (S) from the image discrimination unit 790 so as to provide the same function of the UCR unit 760 in the above mentioned embodiment. In this variation, the color conversion unit 750 generates C, M, Y, and Bk signals using one of the complementary coefficients in accordance with the selection signal (S) from the image discrimination unit 790. Then, the UCR unit 760 would eliminate the Bk component from the other image signals of C, M, and Y so as to generate the C', M', and Y' signals with respect to the colorant density for image forming.

In case of duplicating a plurality of copies from the original document, a designation of the number of copies is input from the operation board 300, and the system controller 600 stores the result of the discrimination from the image discrimination unit 790. Accordingly, the system controller 600 provides the selection signal (S) to the UCR unit 760 for duplicating the original document so as to provide appropriate UCR process after the second sheet. In this case, it may not be necessary to perform the first scanning operation for copies after the first copy. Further, if sufficient memory exists to store an entire image of a page, a plurality of scanning operations may not be needed.

This invention may be conveniently implemented using a microprocessor programmed according to the teachings of the present invention, as will be apparent to those skilled in the computer art. Appropriate software coding can readily be prepared by skilled programmers based on the teachings of the present disclosure, as will be apparent to those skilled in the art. The invention may be implemented by the preparation of application specific integrated circuits, by one or more digital signal processors, or by interconnecting an appropriate network of conventional component circuits, as will be readily apparent to those skilled in the art.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. An image forming apparatus, comprising:
   image input means for inputting an image of an original document to obtain color image signals made of pixels;
   discriminating means for discriminating chromatic component characteristics of the original document using the color image signals obtained by a first portion of a first scan performed by the image input means;
   selecting means, operatively connected to said discriminating means, for selecting parameters of an under color removal process using the discriminated chromatic component characteristics of the original document, said parameters used during a second portion of the first scan of the original document to determine a black component and also during a second scan of the original document by the image input means used to generate cyan, magenta and yellow components;

an under color removal means, connected to the selecting means, for performing the under color removal process on the color image signals obtained from the image input means based on the parameters selected by the selecting means on image information obtained during the second portion of the first scan which is used to generate the black component and on image information obtained during the second scan used to generated the cyan, the magenta, and the yellow components; and a printer for generating an image of the original document on a recording medium using the color image signals processed by the under color removal means.

2. An apparatus according to claim 1, wherein said discriminating means discriminates a line address of the original document which designates a main scan line at which color characteristics of the original document change.

3. An apparatus according to claim 2, wherein said selecting means selects different parameters for the under color removal means for different parts of said image so that different portions of the image having different under color removal processes performed thereon.

4. A system for processing images, comprising:
  means for performing a first portion of a first scan to determine a black component of a first portion of an image;
  means for analyzing the first portion in order to determine if the image is chromatic;
  means for changing parameters used by an under color removal process, when the image is determined to be chromatic;
  means for performing a second portion of the first scan to determine a black component of a second portion of the image and performing the under color removal process on image information obtained by the second portion of the first scan using said parameters which have been changed; and
  means for performing a second scan of the image to determine cyan, magenta, and yellow components of the image and performing the under color removal process on image information obtained by the second scan using said parameters which have been changed.

5. An apparatus according to claim 1, wherein the image input means includes a scanner.

6. An apparatus according to claim 1, wherein the image input means includes an interface for obtaining the image of the original document from one of a computer and a video source.

7. An image forming method, comprising the steps of:
  inputting an image of an original document to obtain color image signals made of pixels;
  discriminating chromatic component characteristics of the original document using the color image signals obtained by a first portion of a first scan performed by the input step;
  selecting parameters of an under color removal process using the discriminated chromatic component characteristics of the original document, said parameters used during a second portion of the first scan of the original document to determine a black component and also during a second scan of the original document by the input step used to generate cyan, magenta and yellow components; and
  performing the under color removal process on the color image signals based on the parameters selected by the selecting step on image information obtained during the second portion of the first scan which is used to generate the black component and on image information obtained during the second scan used to generated the cyan, the magenta, and the yellow components.

8. A system according to claim 4, wherein said means for performing a first portion of a first scan comprises:
  means for performing a first portion of a first scan to determine the black component of the first portion of the image without having any color components of the first portion of the image.

9. A method according to claim 7, wherein said selecting step is performed a plurality of times for different portions of an image so that the under color removal process is performed differently for the different portions of the image.

10. A method according to claim 7, further comprising the step of:
  printing the image signals on which the under color removal process has been performed.

11. An apparatus according to claim 1, wherein the under color removal means comprises:
  means for removing a portion of each of the cyan, magenta, and yellow components of the color image signals while retaining a portion of each of the cyan, magenta, and yellow components of the color image signals.

12. An apparatus according to claim 1, wherein the under color removal means comprises:
  means for removing at least a portion of each of the cyan, magenta, and yellow components of the color image signals while retaining a portion of only two of the cyan, magenta, and yellow components of the color image signals.

13. A method according to claim 7, wherein the under color removal step comprises:
  removing a portion of each of the cyan, magenta, and yellow components of the color image signals while retaining a portion of each of the cyan, magenta, and yellow components of the color image signals.

14. A method according to claim 7, wherein the under color removal step comprises:
  removing at least a portion of each of the cyan, magenta, and yellow components of the color image signals while retaining a portion of only two of the cyan, magenta, and yellow components of the color image signals.

15. A method of processing images, comprising the steps of:
  performing a first portion of a first scan to determine a black component of a first portion of an image;
  analyzing the first portion in order to determine if the image is chromatic;
  changing parameters used by an under color removal process, when the image is determined to be chromatic;
  performing a second portion of the first scan to determine a black component of a second portion of the image and performing the under color removal process on image information obtained by the second portion of the first scan using said parameters which have been changed; and
  performing a second scan of the image to determine cyan, magenta, and yellow components of the image and performing the under color removal process on image information obtained by the second scan using said parameters which have been changed.

16. A method according to claim 15, wherein said step of performing a first portion of a first scan comprises:
  performing the first portion of the first scan to determine the black component of the first portion of the image without having any color components of the first portion of the image.

* * * * *